US011650319B2

(12) United States Patent
Novel et al.

(10) Patent No.: US 11,650,319 B2
(45) Date of Patent: May 16, 2023

(54) ASSIGNING EACH POINT OF A POINT CLOUD TO A SCANNER POSITION OF A PLURALITY OF DIFFERENT SCANNER POSITIONS IN A POINT CLOUD

(71) Applicant: Bentley Systems, Incorporated, Exton, PA (US)

(72) Inventors: Cyril Novel, Paris (FR); Alexandre Gbaguidi Aisse, Suresnes (FR)

(73) Assignee: Bentley Systems, Incorporated, Exton, PA (US)

( * ) Notice: Subject to any disclaimer, the term of this patent is extended or adjusted under 35 U.S.C. 154(b) by 597 days.

(21) Appl. No.: 16/779,898

(22) Filed: Feb. 3, 2020

(65) Prior Publication Data

US 2021/0157001 A1    May 27, 2021

(30) Foreign Application Priority Data

Nov. 21, 2019 (EP) .................................. 19306500

(51) Int. Cl.
*G01S 17/89* (2020.01)
*G01S 7/48* (2006.01)
(Continued)

(52) U.S. Cl.
CPC ............ *G01S 17/89* (2013.01); *G01S 7/4808* (2013.01); *G06T 7/521* (2017.01); *G06T 7/60* (2013.01);
(Continued)

(58) Field of Classification Search
None
See application file for complete search history.

(56) References Cited

U.S. PATENT DOCUMENTS 6,512,518 B2    1/2003   Dimsdale
8,314,794 B2   11/2012   Paulsen
(Continued)

FOREIGN PATENT DOCUMENTS

WO    WO-2015200782 A1 * 12/2015 ............. G06T 17/00
WO    WO-2019060450 A1 *  3/2019 ............. A61K 35/545

OTHER PUBLICATIONS

Abmayr T et al., "Calibration and registration framework for 3D reconstruction of the Kirche Seefeld" Proceedings of International Society for Photogrammetry And Remote Sensing XX, XX, vol. 18, No. 5/W1, Feb. 25, 2009, pp. 1-8.
(Continued)

*Primary Examiner* — Arleen M Vazquez
*Assistant Examiner* — Brandon J Becker
(74) *Attorney, Agent, or Firm* — Cesari and McKenna, LLP (57) ABSTRACT

In an example embodiment, a process may create a disk for each point of the point cloud, where a size of the disk and the orientation of the disk are respectively based on a computed scale and a non-oriented normal. The process may insert each disk into a search structure that is queried to determine if one or more disks intersect the paths from a given point to each scanner in the point cloud. The process may create an output corresponding to each scanner in the point cloud, where each output includes the number of intersecting disks and the distance from the given point to the scanner. The process may implement a sorting algorithm to assign the given point to a scanner position. An application may utilize the assignment of each point in the point cloud to a scanner position to generate a high-resolution 3D mesh of a scene.

20 Claims, 5 Drawing Sheets

(51) Int. Cl.
*G06T 7/60* (2017.01)
*G06T 7/521* (2017.01)
*G06T 7/73* (2017.01)

(52) U.S. Cl.
CPC ...... *G06T 7/73* (2017.01); *G06T 2207/10028* (2013.01)

(56) References Cited

U.S. PATENT DOCUMENTS

| | | | | |
|---|---|---|---|---|
| 9,934,590 | B1* | 4/2018 | Cheng | G06V 10/435 |
| 11,126,831 | B2* | 9/2021 | Murakami | G06V 20/41 |
| 2010/0177963 | A1* | 7/2010 | Yokomitsu | G06T 7/20 382/170 |
| 2010/0208234 | A1* | 8/2010 | Kaehler | G01S 17/42 356/5.01 |
| 2016/0073081 | A1 | 3/2016 | Becker et al. | |
| 2018/0313956 | A1* | 11/2018 | Rzeszutek | G01S 17/42 |
| 2019/0018680 | A1* | 1/2019 | Charamisinau | G06V 20/13 |
| 2019/0124317 | A1* | 4/2019 | Rivas Perpen | H04N 13/15 |
| 2019/0155973 | A1 | 5/2019 | Morczinek et al. | |
| 2019/0235083 | A1 | 8/2019 | Zhang et al. | |
| 2020/0027266 | A1* | 1/2020 | Chen | G06T 17/10 |
| 2020/0043186 | A1 | 2/2020 | Selviah et al. | |
| 2020/0126208 | A1 | 4/2020 | Ponto et al. | |

OTHER PUBLICATIONS

D. D. Lichti, "The Impact of Angle Parameterisation on Terrestrial Laser Scanner Self-Calibration" Jan. 1, 2009, retrieved from the internet: URL: https://pdfs.semanticscholar.org/a305/02dad18cflf9a061f8ef7038e55755ba0863.pdf [retrieved on Nov. 8, 2019].

Extended European Search Report dated Nov. 20, 2019 for European Patent Application No. 19305648.8 for Bentley Systems, Inc., 22 pages.

S. Bechtold et al., "Helios: A Multi-purpose LIDAR Simulation Framework for Research, Planning and Training of Laser Scanning Operations with Airborne, Ground-based Mobile and Stationary Platforms," ISPRS Annals of Photogrammetry, Remote Sensing and Spatial Information Sciences, vol. III-3, Jun. 3, 2016, pp. 161-168.

Berger et al., "A Survey of Surface Reconstruction from Point Clouds", vol. 36, No. 1, Jan. 1, 2017, pp. 310-329.

Novel et al., "Comparing Aerial Photogrammetry and 3D Laser Scanning Methods for Crating 3D Models of Complex Objects. A Bentley Systems White Paper", Apr. 30, 2016, pp. 1-9, retrieved from the Internet: URL:https://www.bentley.com/'/asset/14/9089.ashx [retrieved on Jun. 15, 2020].

Extended European Search Report dated Jul. 2, 2020 for EP Application No. 19306500.0-1222 for Gbaguidi Aisse, Alexandre, et al., 7 pages.

* cited by examiner

ASSIGNING EACH POINT OF A POINT CLOUD TO A SCANNER POSITION OF A PLURALITY OF DIFFERENT SCANNER POSITIONS IN A POINT CLOUD

CROSS-REFERENCE TO RELATED APPLICATION

The present application claims priority to commonly assigned copending European Patent Application Serial No. 19 306 500.0 which was filed on Nov. 21, 2019, by Cyril Novel et al. for ASSIGNING EACH POINT OF A POINT CLOUD TO A SCANNER POSITION OF A PLURALITY OF DIFFERENT SCANNER POSITIONS IN A POINT CLOUD, which is hereby incorporated by reference.

BACKGROUND

Technical Field

The present disclosure relates generally to processing point clouds, and more specifically to assigning each point of a point cloud to a scanner position of a plurality of different scanner positions in the point cloud to process the point cloud.

Background Information

Particular applications, e.g., the ContextCapture™ application available from Bentley Systems, Inc., may automatically generate a high-resolution 3D mesh of a scene from photographs and/or from one or more point clouds as captured by scanners, e.g., Light Detection and Ranging (LiDAR) scanners. In order to reconstruct point clouds acquired from the scanners, the particular applications may need to know the position of each scanner in the environment, i.e., scene, and may also need visibility information for each point of the point cloud, e.g., which scanner has visibility to each point of the point cloud. The metadata, which typical stores the visibility information, may not be provided with the file/object that stores point cloud (e.g., point cloud data). Therefore, and according to traditional techniques, the point cloud cannot be processed by the applications to generate the high-resolution 3D mesh of the scene because of the missing visibility information.

SUMMARY

Techniques are provided for assigning each point of a point cloud to a scanner position of a plurality of different scanner positions in the point cloud. In an embodiment, a plurality of scanners, such as LiDAR scanners, may scan a scene to capture a point cloud. A process may utilize the position information (e.g., x, y, and z coordinates) of the points of the point cloud and the positions (e.g., x, y, and z coordinates) of the scanners to assign each point of the point cloud to a scanner position of a plurality of different scanner positions in the point cloud according to one or more embodiments described herein.

Specifically, the process may compute a scale for each point of the point cloud based on a distance from the point to its N/2 closest neighbor. The scale may represent a local size of the point, which may be based on the size of the point's local neighborhood. N may be selected as a design parameter and may be a value such as, but not limited to, a number between 15 and 50. To remove outlier scales from the computed scales, the process may apply a non-linear normalization by setting the bottom c % scales to the $c^{th}$ percentile value and by setting the top c % scales to the $100\text{-}c^{th}$ percentile value. In addition, and for each point of the point cloud, the process may compute a non-orientated normal value utilizing a known principal component analysis (PCA) algorithm.

The process may then create a disk for each point of the point cloud, where a size of the disk is based on the computed scale for the point and the orientation of the disk in space is based on the computed non-orientated normal for the point. For example, the center of the disk may lie at the position of the point (e.g., x, y, and z coordinates) and the radius of the disk may be the computed scale for the point. In addition, the non-oriented normal computed for the point may be used for orientating the disk in space.

The process may then insert each disk, representing a different point of the point cloud, in a search structure that may be utilized for the efficient computation of the intersection of an input value with a set of objects. For example, the search structure may be an Axis Aligned Bounding Box (AABB) tree that is utilized to determine which disks, representing different points, intersect a segment (i.e., path) in space between a point and a particular scanner.

Specifically, the process may create L segments for a given point of the point cloud, where L is equal to the number of scanners in the point cloud and each of the L segments is a pair that includes the position of the given point and the position of a different scanner in the point cloud. That is, the L segments represent the paths in space between the position of the given point (e.g., x, y, and z coordinates) and each of the different scanner positions (e.g., x, y, and z, coordinates) in the point cloud. The process may then query the search structure, utilizing each of the L segments for the given point, to obtain the disks, if any, that intersect each segment, e.g., each path between the given point and a different scanner. Therefore, the process may obtain a listing of the one or more disks, if any, that intersect/occlude each path from the given point to a different scanner in the point cloud.

The process may then create L outputs for the given point, where each output corresponds to a different scanner and includes at least the number, if any, of intersecting (i.e., occluding) disks in the path from the point to the different scanner, and the distance from the point to the different scanner. The process may then exclude particular disks, from the total number of disks for each of the L outputs, which are determined to be false positives, e.g., intersecting disks that may be created because of noise that may be inherent to point clouds captured by LiDAR scanners. Specifically, the process may utilize the distances between a particular scanner and the given point, the distance between the given point and a particular intersecting disk, and the distance between the particular scanner and the particular intersecting disk to determine whether the particular disk is a false positive and should be excluded. The process may then adjust (e.g., decrease) the number of intersecting disks for the output based on the exclusion of a disk determined to be a false positive.

The process may implement a sorting algorithm that compares the values in a plurality of the L outputs to identify a scanner, of the plurality of scanner in the point cloud, which has the best view of the given point (e.g., clearest line of sight with the least occlusions to the given point). The process may then assign the given point to the scanner position, i.e., the position of the scanner determined to have the best view of the given point. For simplicity purposes, reference may be made to assigning a single point of a point cloud to a scanner position of a plurality of different scanner positions in the point cloud. However, it is expressly contemplated that the process may assign each of the plurality of points of the point cloud, in parallel or serially, to a scanner position of a plurality of different scanner positions according to the one or more embodiments described herein. The process may create one or more data structures, e.g., one or more visibility data structures, which store the assignment of each point of the point cloud to a scanner position.

The process may then orient the normal of each point based on a dot product of the computed non-oriented normal value for the point and the direction to the scanner position the point is assigned to. If the dot product is a positive value, then the orientation of the computed normal value is correct. However, if the dot product is a negative value, the process may invert the sign of computed normal value for the point.

Advantageously, particular applications, e.g., ContextCapture™, which require the visibility information, may process point clouds without the metadata that typically stores the visibility information. For example, the application may receive the point cloud (i.e., point cloud data) captured for a scene from multiple scanners and may also obtain the positions of the multiple scanners. The application may process the point cloud, utilizing the assignment of each point of the point cloud to a scanner position performed according to the one or more embodiments described herein, to generate a high-resolution 3D mesh of the scene. Therefore, the one or more embodiments described herein provide an improvement in the existing technological field of point cloud processing since the particular applications, which require the visibility information, can process point cloud utilizing the assignment of each point of the point cloud to a scanner position performed according to the one or more embodiments described herein. In addition, the one or more embodiments described herein have a practical application since the particular applications, which require that the visibility information, can process the point cloud with the assignment of each point of the point cloud to a scanner position performed according to the one or more embodiments described herein.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
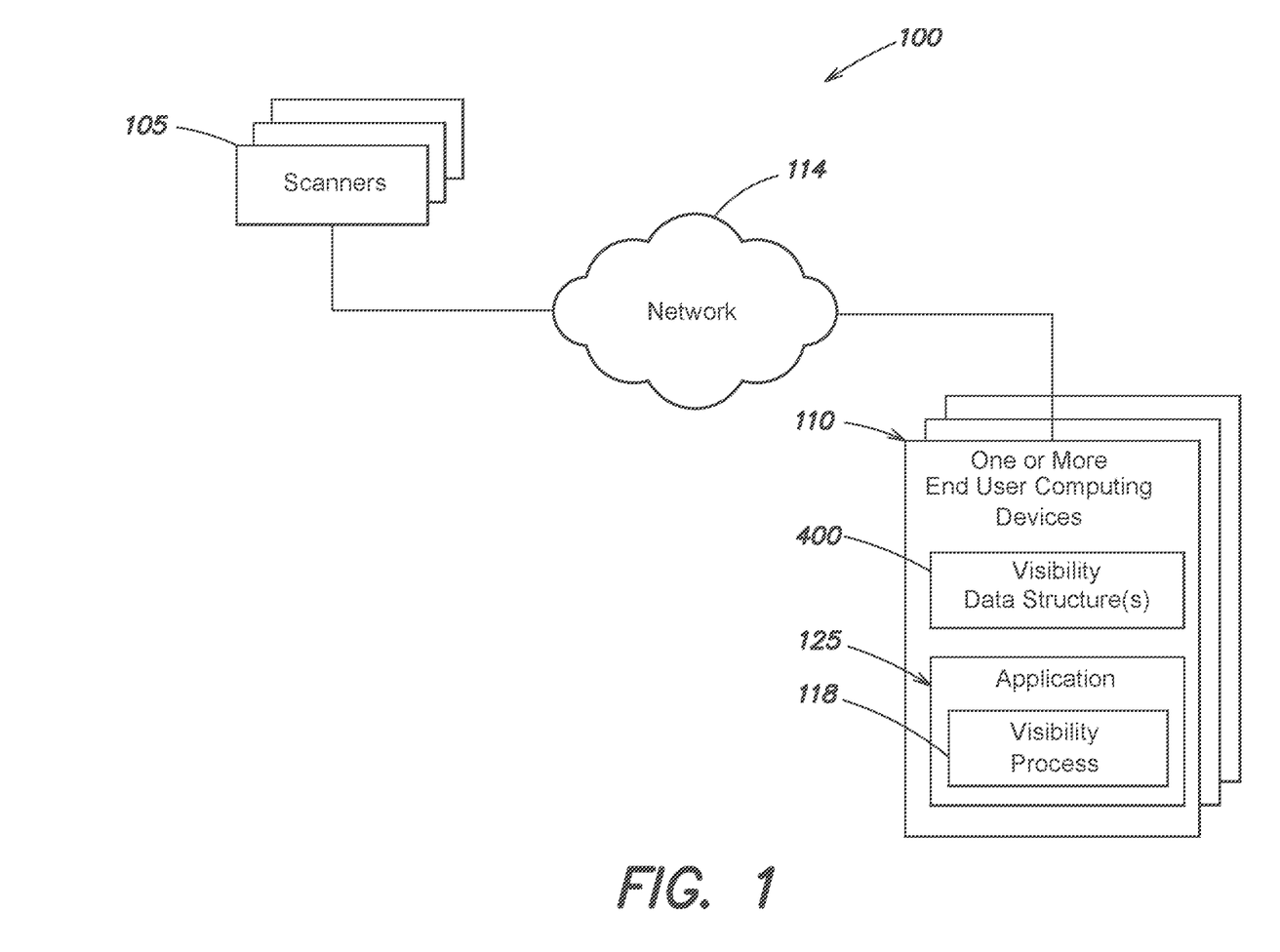
FIG. 1 is a high-level block diagram of an example environment according to one or more embodiments described herein.

FIG. 1 is a high-level block diagram of an example environment 100 according to one or more embodiments described herein. In an embodiment, the environment 100 includes a plurality of scanners 105 and one or more end user computing devices 110 that may communicate via network 114.

The scanners 105 may be, for example, LiDAR scanners, or other type of scanners that capture source data, such as a point cloud, that includes a plurality of points in space representing the external surfaces of objects in a scene in which the scanners 105 are located and operating.

Each end user computing device 110 in environment 100 may include processors, memory, storage systems, and other hardware (not shown). The one or more end user computing devices 110 may include one or more graphical user interfaces (GUIs) that allows a user to interact with an application 125 executing on the end user computing device 110. The application 125 may be, but is not limited to, 3D modeling software. For example, the 3D modeling software may be the ContextCapture™ application available from Bentley Systems, Inc., which processes point clouds to generate high-resolution 3D meshes of a scene. The application 125 may receive a file/object including the point cloud without visibility information from the scanners 105 over the network 114. Alternatively, the end user computing device 110 may receive the file/object including the point cloud without the visibility information in any of a variety of different ways. For example, the file/object may be stored on a storage device (e.g., solid-state drive (SSD), hard drive, etc.) and transferred to the end user computing device 110. The application 125 may include visibility process 118 that implements one or more embodiments described herein. Specifically, visibility process 118 may assign each point of a point cloud to a scanner position of a plurality of different scanner positions in the point cloud. The end user computing device 110 may store visibility data structure(s) 800 that stores an assignment of each point of the point cloud to a scanner position according to the one or more embodiments described herein. The application 125 may utilize, for example, the assignment of each point of the point cloud to a scanner position to process a point cloud and generate a 3D mesh of a scene in which the scanners 105 are located and operating.

Figure 2A:
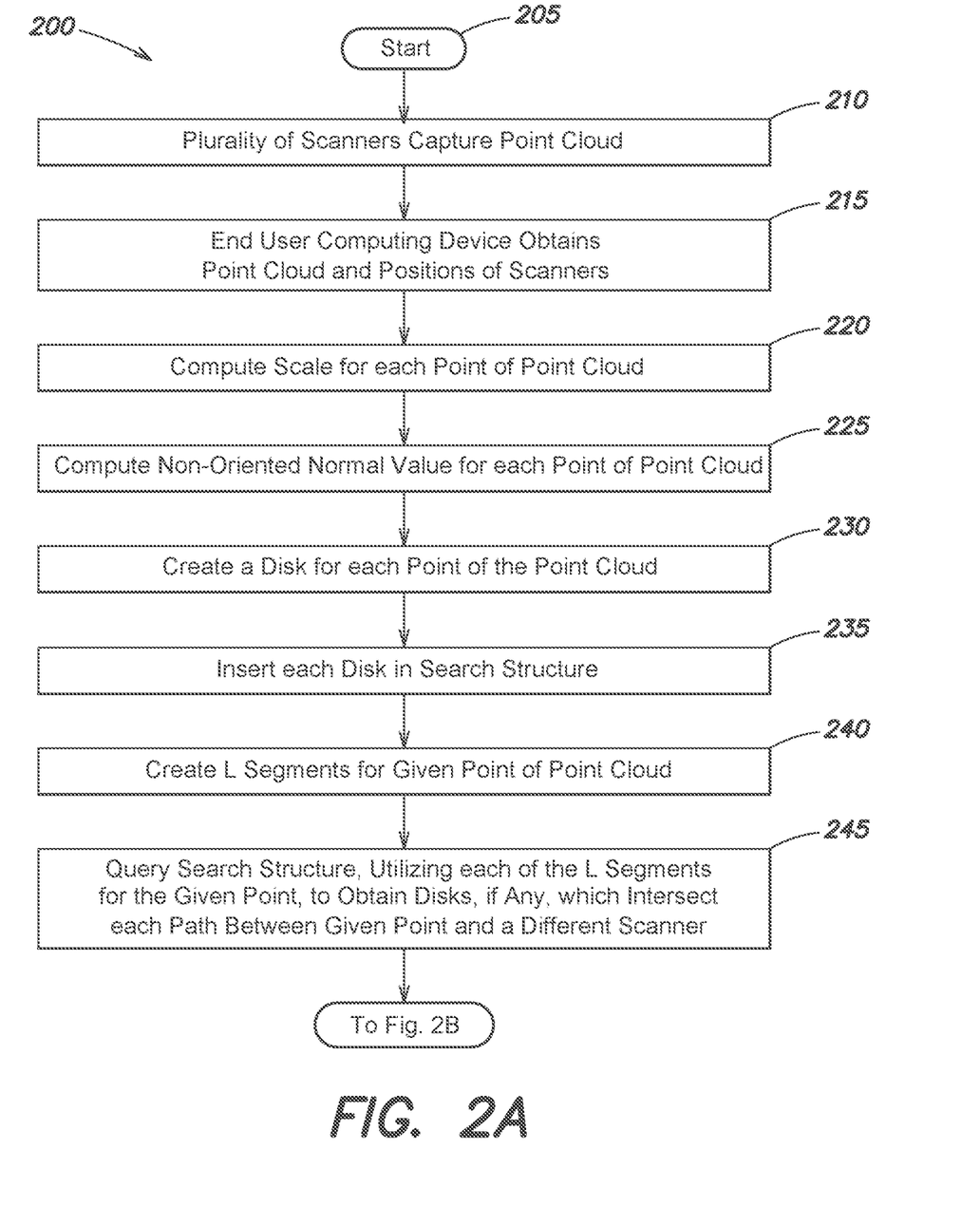
FIGS. 2A and 2B are a flow diagram of a sequence of steps for assigning each point of a point cloud to a scanner position of a plurality of different scanner positions in the point cloud.
Figure 2B:
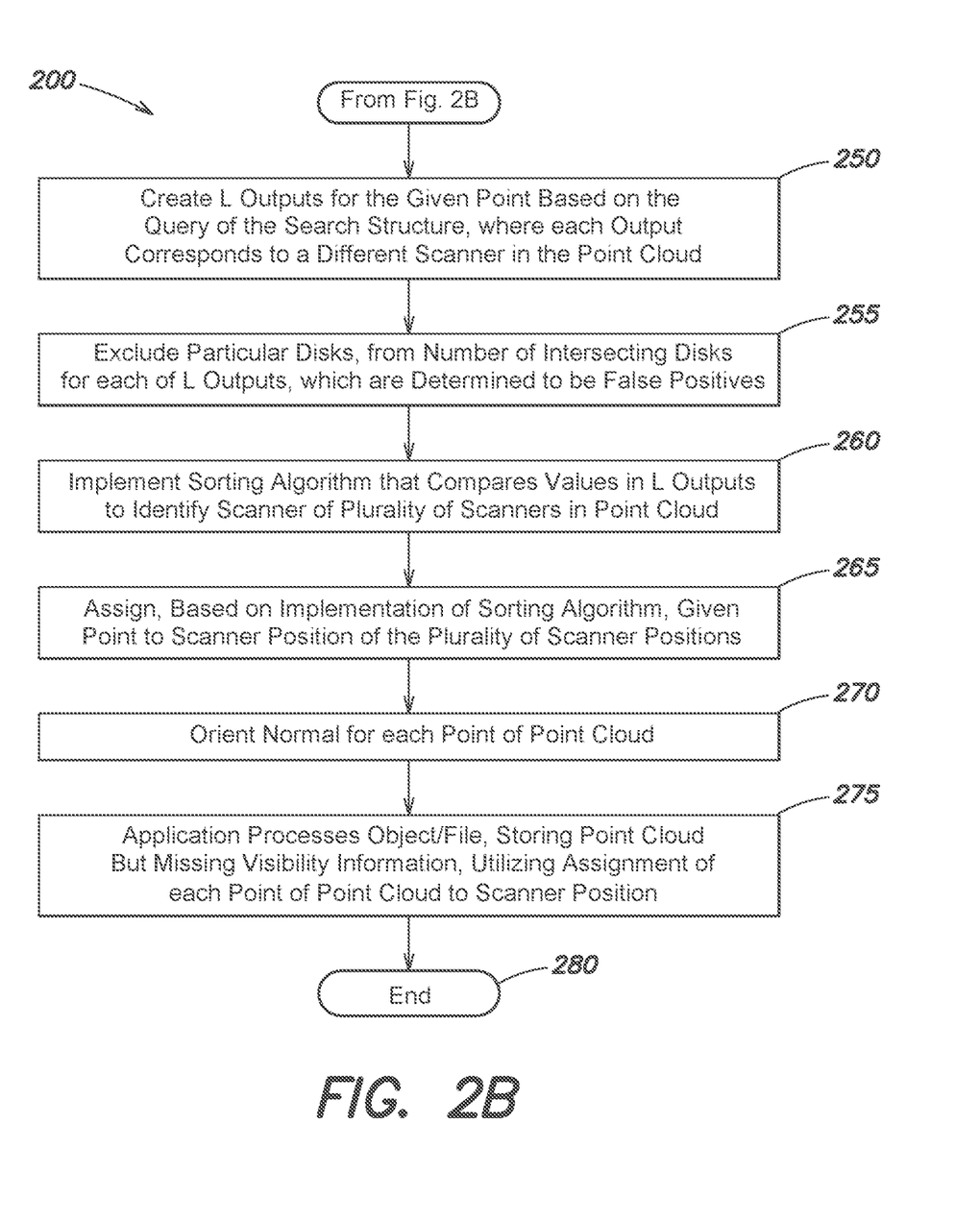

FIGS. 2A and 2B are a flow diagram of a sequence of steps for assigning each point of a point cloud to a scanner position of a plurality of different scanner positions in the point cloud according to one or more embodiments described herein. For simplicity purposes, the examples described herein may refer to a point cloud including a particular number of scanners, however it expressly contemplated that the one or more embodiment described herein may assign each point of the point cloud to a scanner position in a point cloud having any number of scanners.

Figure 3:
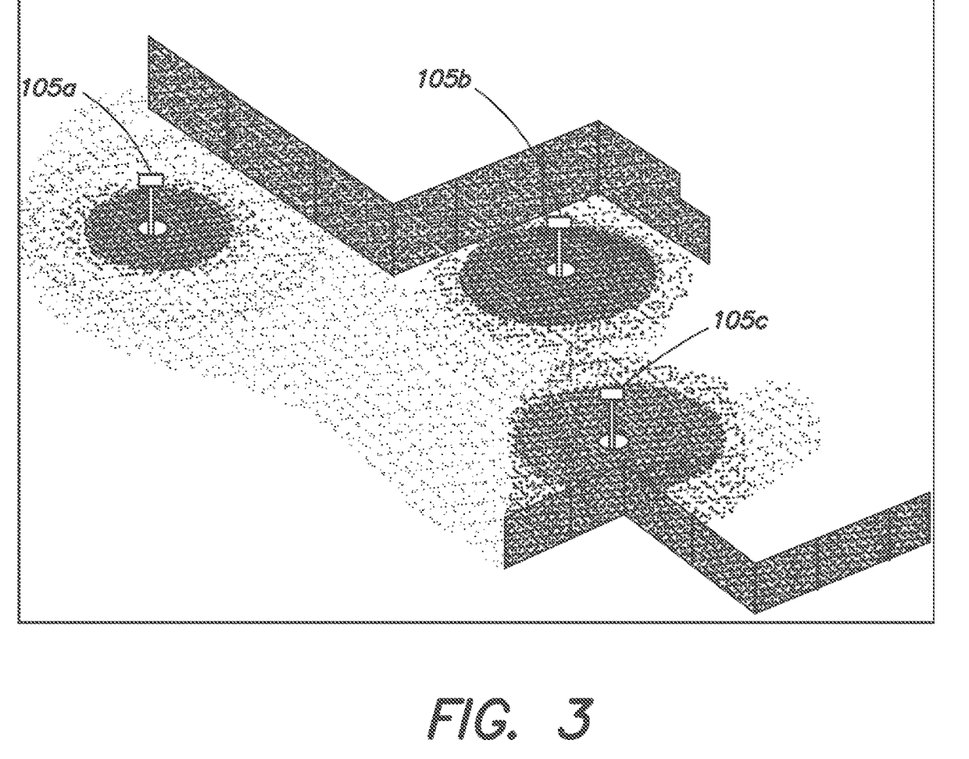
FIG. 3 is a diagram illustrating an example scene in which scanners 105 are located and operating according to one or more embodiments described herein.

The procedure 200 starts at step 205 and continues to step 210 where the plurality of scanners 105 capture a point cloud of a scene. FIG. 3 is a diagram illustrating an example scene in which scanners 105 are located and operating according to one or more embodiments described herein. Scanners 105 may operate in scene 300 that, for example, includes a plurality of objects (e.g., walls, ground, etc.). The scanners 105 may be a LiDAR scanner that captures a point cloud that includes a plurality of points in space representing the external surfaces of the objects in scene 300. For example, and as depicted in FIG. 3, there are three scanners (e.g., 105a, 105b, and 105c) that rotate to scan the scene 300 in all directions, where objects that are closer to the scanner may capture more densely than objects that are farther away. The point cloud captured from the scan of scene 300 by the scanners 105a, 105b, and 105c may include a plurality of points that each having a position (e.g., x, y, and z coordinates) relative to the scanners 105.

The position of each scanner, 105a, 105b, and 105c, may be known and/or determined. At step 215, the end user computing device 110, and more specifically the visibility process 118, obtains the point cloud and the position of the scanners 105. For example, one or more of the scanners 105a, 105b, and 105c, may provide the point cloud to the end user computing device 110 over network 114. Alternatively, the end user computing device 110 may receive the point cloud in any of a variety of different ways. For example, the point cloud may be stored on a storage device (e.g., solid-state drive (SSD), hard drive, etc.) and transferred to the end user computing device 110. The end user computing device 110 may receive the point cloud without visibility information, e.g., which scanner has visibility to each point of the point cloud. In addition, the end user computing device 110 may receive or obtain (e.g., determine) the position of each scanner (e.g., 105a, 105b, and 105c) in the point cloud. For example, the end user computing device 110 may receive the position of each scanner over the network 114 from the scanners (e.g., 105a, 105b, and 105c). Alternatively, the end user computing device 110 may receive the position of each scanner in any of a variety of different ways. For example, the position of each scanner may be stored on a storage device and transferred to the end user computing device 110.

The procedure continues to step 220, and the visibility process 118 computes a scale for each point of the point cloud. For example, the visibility process may compute a scale for a point of the point cloud based on a distance from the point to its N/2 closest neighbor. The scale may represent a local size of the point, which may be based on the size of the point's local neighborhood. In addition, N may be selected as a design parameter and may be value such as, but not limited to, a number between 15 and 50. In an embodiment, N is 25. As such, and for the point, the visibility process 118 computes the distance from the point to its $25^{th}$ closest neighbor and divides that distance by 2 to compute the scale for the point. The visibility process 118 computes the scale for each point of the point cloud in a similar manner and according to one or more embodiments described herein. To remove outlier scales from the scales computed for the points of the point cloud, the visibility process 118 may apply a non-linear normalization by setting the bottom c % scales to the $c^{th}$ percentile value and by setting the top c % scales to the 100-$c^{th}$ percentile value. In an embodiment, c may be 5. As such, the visibility process 118 may set the bottom 5% of the computed scale values to the $5^{th}$ percentile computed scale value, and may also set the top 5% of the computed scale values to the $95^{th}$ percentile computed scale value.

The procedure continues to step 225 and the visibility process 118 may compute a non-oriented normal value for each point of the point cloud. For example, the visibility process 118 may utilize a known principal component analysis (PCA) algorithm with parameters, e.g., number of neighboring points, to compute the non-oriented normal value for each point of the point cloud. The procedure continues to step 230 and the visibility process creates a disk for each point of the point cloud. As known by those skilled in the art, points of a point cloud are discreet information such that each point of the point cloud does not have a volume/area. Accordingly, the information associated with the points, e.g., x, y, and z, coordinates, cannot be utilized to determine if a path between a point and a scanner is intersected by other points of the point cloud. To overcome this inherent deficiency associated with a point cloud, the visibility process 118, according to one or more embodiments described herein, may create a disk for each point of the point cloud. By creating a disk for each point of the point cloud, a coarse representation of the surface is created and that can be utilized to determine if the path between a point and a scanner is obstructed by the surface, as will be described in further detail below.

The size of the disk for the point may be based on the computed scale for the point and the orientation of the disk in space may be based on the computed non-orientated normal value for the point. For example, let it be assumed that a given point of the point cloud has its x, y, and z coordinates at 0, 0, 0 and the computed scale for the given point is a value of 2 cm. Therefore, the disk created for the given point has its center at 0, 0, 0 and the radius of the disk is 2 cm. In addition, let it be assumed that the computed non-orientated normal value for the point is z=1. As such, the disk for the given point is horizontal (i.e., flat). The visibility process 118 may create a disk for each of the other points of the point cloud in a similar manner and according to one or more embodiments described herein.

The procedure continues to step 235 and the visibility process 118 inserts each disk, created for and representing a different point of the point cloud, in a search structure that may be utilized for the efficient computation of the intersection of an input value with a set of objects. For example, the search structure may be an axis aligned bounding box (AABB) tree that is utilized to determine which disks, representing different points, intersect a segment (i.e., path) in space between a point and a particular scanner.

The procedure continues to step 240 and the visibility process 118 creates L segments for a given point of the point cloud. Specifically, L may be equal to the number of scanners in the point cloud and each of the L segments is a pair that includes the position of the given point and the position of a different scanner in the point cloud. That is, the L segments represent the paths in space between the given point (e.g., x, y, and z coordinates) and each of the different scanner positions (e.g., x, y, and z, coordinates) in the point cloud.

For example, and with reference FIG. 3, the visibility process 118 may create 3 segments for a given point of the point cloud, since there are three scanners (105a, 105b, and 105c) in the point cloud. Specifically, the visibility process 118 may create a first segment for the path from the position of the given point to the position of the first scanner 105a. Thus, the first segment includes a pair that consists of the position of the given point and the position of the first scanner 105a. In addition, the visibility process 118 may create a second segment for the path from the position of the given point to the position of the second scanner 105b. Thus, the second segment includes a pair that consists of the position of the given point and the position of the second scanner 105b. Further, the visibility process 118 may create a third segment for the path from the position of the given point to the position of the third scanner 105c. Thus, the third segment includes a pair that consists of the position of the given point and the position of the third scanner 105c.

The procedure continues to step 245 and the visibility process 118 queries the search structure, utilizing each of the L segment for the given point, to obtain the disks, if any, which intersect each path between the given point and a different scanner. For example, and with reference to FIG. 3, the visibility process may utilize the three segments created for the given point as input to the AABB tree. In response to utilizing the first segment as input, the AABB tree determines if there are any disks, representing other points of the point cloud, that intersect the path from the position of the given point to the position of first scanner 105a. If so, the AABB tree provides as output the listing of the one or more disk that intersect the path from the position of the given point to the position of the first scanner 105a.

In response to utilizing the second and third segments as input, the AABB tree determines if there are any disks, representing other points of the point cloud, that intersect the paths from the position of the given point to the positions of the second scanner 105b and third scanner 105c. If so, the AABB tree provides as output the listing of the one or more disks that intersect the paths from the position of the given point to the positions of the second scanner 105b and the path from the position of the given point to the position of the third scanner 105c. Therefore, the visibility process 118 may obtain a listing of the one or more disks, if any, that intersect/occlude the path from the given point to each of the different scanners (e.g., 105a, 105b, and 105c) in the point cloud.

The procedure continues to step 250 and the visibility process 118 creates L outputs for the given point based on the query of the search structure, where each output corresponds to a different scanner in the point cloud. Each output may include at least the number, if any, of intersecting (i.e., occluding) disks in the path from the point to the different scanner and the distance from the point to the different scanner. For example, and with reference to FIG. 3, the visibility process 118 creates three outputs for the given point of the point cloud. Specifically, the first output corresponds to the first scanner 105a and includes the number of disks, if any, that intersect the path from the position of the given point to the position of the first scanner 105a. In addition, the first output includes the distance from the given point to the position of the first scanner 105a. In this example, let it be assumed that the first output indicates that 6 disks intersect the path from the position of the given point to the position of the first scanner 105a, and the distance from the position of the given point to the position of the first scanner 105a is 50 cm.

The second output corresponds to the second scanner 105b and includes the number of disks, if any, that intersect the path from the position of the given point to the position of the second scanner 105b. In addition, the second output includes the distance from the given point to the position of the second scanner 105b. In this example, let it be assumed that the second output indicates that 0 disks intersect the path from the position of the given point to the position of the second scanner 105b, and the distance from the position of the given point to the position of the second scanner 105b is 100 cm.

The third output corresponds to the third scanner 105c and includes the number of disks, if any, that intersect the path from the position of the given point to the position of the third scanner 105c. In addition, the third output includes the distance from the given point to the position of the third scanner 105c. In this example, let it be assumed that the third output indicates that 4 disks intersect the path from the position of the given point to the position of the third scanner 105a, and the distance from the position of the given point to the position of the third scanner 105c is 25 cm.

The procedure continues to step 255 and the visibility process 118 excludes particular disks, from the number of intersecting disks in each of the L outputs, which are determined to be false positives, e.g., intersecting disks that are created because of noise that may be inherent to point clouds captured by LiDAR scanners. Specifically, points that lie on a same surface may not be perfectly aligned due to noise (e.g., due to noise a first point on a horizontal plane may appear as being above the horizontal plane while a second point on the horizontal plane may appear as being below the horizontal plane). As a result, the two disks representing the two points that in fact lie on the same plane would incorrectly intersect with each other due to the noise. Thus, and to account for the noise that is inherent to point clouds, the visibility process 118 may exclude particular disks that are determined to be associated with noise by considering the distances between the scanner, a given point, and particular disks.

Specifically, the visibility process 118 may utilize the distances between a particular scanner and a given point (d1), the distance between the given point and a particular intersecting disk (d2), and the distance between the particular scanner and the particular intersecting disk (d3) to determine whether the particular disk is a false positive and should thus be excluded from the output. More specifically, the visibility process 118 may determine that a particular disk is a "true" occluding disk and not a false positive if:

The following two conditions are met:

$d2<d1$, and $d3<d1$;

and at least one of the following conditions is false:

$d2<30$ cm, or the absolute value of the dot product of the compute non-oriented normal value for the given point and the computed non-oriented normal value for the point corresponding to the particular disk is >0.6.

If the above conditions are not satisfied, the visibility process 118 determines that the particular disk is a false positive and adjusts (e.g., decrease) the number of disks in the output. Thus, the visibility process 118 implements the above conditions to exclude those disks that are classified as noise and adjust the number of intersecting disks included in each of the L outputs. In this example, let it be assumed that a particular disk, interesting the path from the given point to the first scanner 105a, is excluded based on the above conditions. As such, the visibility process 118 adjusts the first output such that the number of intersecting disks is decreased from 6 to 5. Thus, the first output now indicates that 5 disks intersect the path from the position of the given point to the position of the first scanner 105a, and the distance from the position of the given point to the position of the first scanner 105a is 50 cm.

The procedure continues to step 260 and the visibility process 118 implements a sorting algorithm that compares the values in the L outputs to identify a scanner of the plurality of scanners in the point cloud. Specifically, the sorting algorithm may compare the values of the L outputs to rank the outputs from best to worst, and thus identify the particular scanner of the plurality of scanners that has a "best", e.g., clearest line of sight with the least occlusions, to the given point. For example, and with reference to FIG. 3, the visibility process may determine which of the three different scanners has the "best" view to the given point. The visibility process 118 may implement the following sorting algorithm with a necessary number of pairs of the L outputs to sort and rank the L outputs from best to worst:

If p is visible (e.g., 0 intersecting disk) and q is not (at least one intersecting disk), then p is better than q;

If q is visible (e.g., 0 intersecting disk) and p is not (at least one intersecting disk), then q is a better than p;

If Np<Nq−1 or if (Np<=Nq+1 and p segment is shorter than q segment), then p is better than q;

Else q is better than p, where p is a first selected output of the L outputs, q is a second selected output of the L outputs, Np is the number of intersecting disks included in the first selected output, Nq is the number of intersecting disks included in the second selected output, p segment is the distance from the position of the given point to the position of the scanner associated with the first selected output, and q segment is the distance from the position of the given point to the position of the scanner associated with the second selected output. The above sorting algorithm takes into account the number of occluding disks in the paths from the given point to each scanner and the distances from the given point to each of the scanners to select a particular scanner as having the "best" view to the given point.

For example, and with reference to the above example, let it be assumed that the visibility process 118 implements the above sorting algorithm with the first output (e.g., 5 intersecting disks and 50 cm from given point to the first scanner 105a), the second output, (e.g., 0 intersecting disks and 100 cm from given point to the second scanner 105b), and the third output (4 intersecting disks and 25 cm from the given point to the third scanner). Specifically, the visibility process 118 may first implement the sorting algorithm with any two outputs. In this example, let it be assumed that the visibility process 118 implements the sorting algorithm with the first output as p and the second output as q. As such, and because there is at least one occluding disk (5) from the given point to the first scanner 105a and there are no occluding disks (0) in the path from the given point to the second scanner 105b, i.e., q is visible and p is not, the visibility process 118 determines that the second output is superior to the first output.

The visibility process 118 may then implement the sorting algorithm with a different pair of outputs. In this example, let it be assumed that the visibility process 118 implements the sorting algorithm with the second output as p and the third output as q. As such, and because there are no occluding disks (0) in the path from the given point to the second scanner 105b and there is at least one occluding disk (4) from the given point to the third scanner 105c, i.e., p is visible and q is not, the visibility process determines that the second output is superior to the third output. As such, the second output, corresponding to the second scanner 105b, is determined to be the best output.

The visibility process 118 may implement the sorting algorithm with the last different pair of outputs. In this example, let it be assumed that the visibility process 118 implements the sorting algorithm with the first output as p and the third output as q. Thus, Np is 5, Nq, is 4, p segment is 50 cm, and q segment is 25 cm. Therefore, Np (5) is not less than Nq−1 (3). In addition, Np (5) is less than or equal to Nq+1 (5), but the p segment (50 cm) is not shorter than the q segment 25 (cm). As such, the third output corresponding to the third scanner is determined to be superior to the first output corresponding to the first scanner. Therefore, and in this example, the visibility process 118 determines that the second output, corresponding to the second scanner 105b, is the best output of the three outputs. In addition, and in this example, the visibility process 118 determines that the third output is the next best output and the first output is the worst output of the three outputs.

The procedure continues to step 265 and the visibility process 118, based on implementation of the sorting algorithm, assigs the given point to a scanner position of the plurality of scanner positions in the point cloud. Specifically, the visibility process 118 assigns the given point to the scanner position of the scanner that corresponds to the output ranked as the best. Continuing with the above example, the visibility process 118 determines and ranks the second output, corresponding to the second scanner 105b, as the best output. As such, the visibility process 118 assigns the given point to the position of the second scanner 105b in the point cloud.

Figure 4:
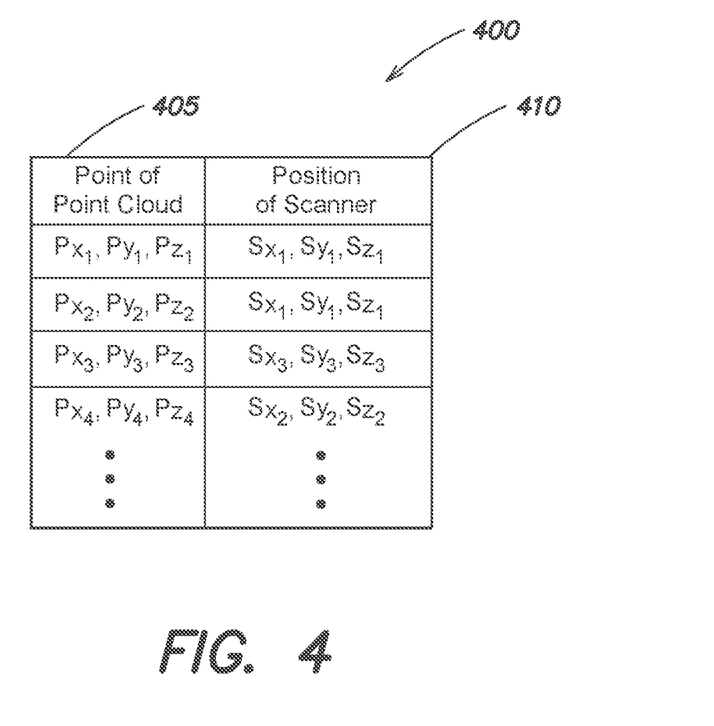
FIG. 4 is an exemplary visibility data structure according to one or more embodiment described herein.

For simplicity purposes, reference may be made to assigning a single point, i.e., the given point, of a point cloud to a scanner position of a plurality of different scanner positions in the point cloud. However, it is expressly contemplated that the visibility process 118 may assign each of the plurality of points of the point cloud, in parallel or serially, to a scanner position of a plurality of different scanner positions according to the one or more embodiments described herein. The visibility process 118 may create visibility data structure 400, stored at the end user computing device 110, which store the assignment of each point of the point cloud to a scanner position of a plurality of different scanner positions. FIG. 4 is an exemplary visibility data structure according to one or is more embodiment described herein. The visibility data structure 400 may include a first column 405 that stores an identifier of each point of the point cloud and a second column 410 that stores a position of the scanner the point is assigned to. The identifier stored in first column 405 may be the x, y, and z coordinates of the point or a different unique identifier associated with the point. The value stored in the second column 410 may be the x, y, and z, coordinates for the scanner.

The procedure continues to step 270 and the visibility process 118 orients the normal for each point of the point cloud based on a dot product of the computed non-oriented normal value and the direction to the scanner position the point is assigned to. Specifically, and continuing with the above example, the visibility process 118 computes the dot product of the non-oriented normal value for the given point and the direction to the second scanner 105b. If the dot product is a positive value, then the orientation of computed normal value is correct. However, if the dot product is a negative value, the visibility process 118 may invert the sign of the computed normal value.

The procedure continues to step 275 and the application processes the object/file, storing the point cloud but missing the visibility information, utilizing the assignment of each point of the point cloud to a scanner position. By processing the object/file, utilizing the assignment of each point of the point cloud to a scanner position, the application 125 may generate a high-resolution 3D mesh of the scene.

Advantageously, particular applications, e.g., Context-Capture™, which require the visibility information, may process point clouds without the metadata that typically stores the visibility information. Therefore, the one or more embodiments described herein provide an improvement in the existing technological field of point cloud processing since the particular applications, which require the visibility information, can process point cloud utilizing the assignment of each point of the point cloud to a scanner position performed according to the one or more embodiments described herein. In addition, the one or more embodiments described herein have a practical application since the particular applications, which require that the visibility information, can process the point cloud with the assignment of each point of the point cloud to a scanner position performed according to the one or more embodiments described herein. The procedure ends at step 280.

It should be understood that various adaptations and modifications may be readily made to what is described above, to suit various implementations and environments. While it is discussed above that many aspects of the techniques may be implemented by specific software processes (e.g., of an application stored in a non-transitory electronic device readable medium for execution on one or more processors) or on specific hardware devices, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method, comprising:
receiving a point cloud that includes a plurality of points each having a position relative to the at least one scanner, wherein the point cloud is captured by a plurality of scanners;
creating a disk for each point of the point cloud, where the disk includes a size based on a computed scale for the point and an orientation based on a computed non-oriented normal for the point;
inserting each disk into a search structure;
creating a plurality of segments for a given point of the point cloud, wherein each of the plurality of segments represents a different path from the given point to each of the plurality of scanners;
querying the search structure utilizing the plurality of segments to determine if one or more disks intersect each path from the given point to each of the plurality of scanners;
creating a plurality of outputs based on the query, wherein each output corresponds to a different scanner of the plurality of scanners, and where each output includes a number of intersecting disks intersecting the path from the given point to the different scanner and further includes a distance from the given point to the different scanner;
implementing a sorting algorithm that compares values of the plurality of outputs to identify a selected scanner of the plurality of scanners, where the selected scanner corresponds to a particular output of the plurality of outputs; and
assigning the given point to a scanner position of the selected scanner.

2. The method of claim 1, wherein the computed scale for the point is computed by dividing the distance from the point to a neighboring point by 2.

3. The method of claim 2, wherein the neighboring point is a $25^{th}$ nearest neighboring point of the point.

4. The method of claim 1, wherein the computed non-oriented normal for the point is computed utilizing a principal component analysis (PCA) algorithm.

5. The method of claim 1, wherein the search structure is an Axis Aligned Bounding Box tree (AABB tree).

6. The method of claim 1, further comprising adjusting the number of intersecting disks for a selected output based on a determination that a particular disk is associated with noise.

7. The method of claim 1, wherein a selected disk, for a selected point of the point cloud, has a center that lies at the x, y, and z coordinate of the selected point, and the selected disk has a radius that corresponds to the computed scale for the selected point.

8. The method of claim 7, wherein the selected disk has an orientation in space that corresponds the computed non-oriented normal.

9. The method of claim 1, wherein the sorting algorithm compares the values of pairs of the plurality of outputs, the sorting algorithm utilizes:
if p is visible and q is not, then p is better than q;
if q is visible and q is not, then q is a better than p;
if Np<Nq−1 or if (Np<=Nq+1 and p segment is shorter than q segment), then p is better than q;
Else q is better than p,
where p is a first selected output of the plurality of outputs, q is a second selected output of the plurality of outputs, Np is the number of intersecting disks included in the first selected output, Nq is the number of intersecting disks included in the second selected output, p segment is the distance from the given point to a first scanner associated with the first selected output, and q segment is the distance from the given point to a second scanner associated with the second selected output.

10. A system for assigning a point of a point cloud to a scanner position of a plurality of scanner positions in the point cloud, the system comprising:
processing logic configured to:
receive the point cloud that includes a plurality of points each having a position relative to at least one scanner, wherein the point cloud is captured by a plurality of scanners;
create a disk for each point of the point cloud, where the disk includes a size based on a computed scale for the point and an orientation based on a computed non-oriented normal for the point;
insert each disk into a search structure;
create a plurality of segments for a given point of the point cloud, wherein each of the plurality of segments represents a different path from the given point to each of the plurality of scanners;
query the search structure utilizing the plurality of segments to determine if one or more disks intersect each path from the given point to each of the plurality of scanners;
create a plurality of outputs based on the query, wherein each output corresponds to a different scanner of the plurality of scanners, and where each output includes a number of intersecting disks intersecting the path from the given point to the different scanner and further includes a distance from the given point to the different scanner;
implement a sorting algorithm that compares values of the plurality of outputs to identify a selected scanner of the plurality of scanners, where the selected scanner corresponds to a particular output of the plurality of outputs; and
assign the given point to a scanner position of the selected scanner.

11. The system of claim 10, wherein the computed scale for the point is computed by dividing the distance from the point to a neighboring point by 2.

12. The system of claim 11, wherein the neighboring point is a $25^{th}$ nearest neighboring point of the point.

13. The system of claim 10, wherein the computed non-oriented normal for the point is computed utilizing a principal component analysis (PCA) algorithm.

14. The system of claim 10, wherein the search structure is an Axis Aligned Bounding Box tree (AABB tree).

15. The System of claim 10, wherein the processing logic is further configured to adjust the number of intersecting disks for a particular output based on a determination that a particular disk is associated with noise.

16. The system of claim 10, wherein a selected disk, for a selected point of the point cloud, has a center that lies at the x, y, and z coordinate of the selected point, and the selected disk has a radius that corresponds to the computed scale for the selected point.

17. The system of claim 16, wherein the selected disk has an orientation in space that corresponds the computed non-oriented normal.

18. The system of claim 10, wherein the sorting algorithm compares the values of pairs of the plurality of outputs, and the processing logic is further configured to utilize a plurality of conditions that include:
if p is visible and q is not, then p is better than q;
if q is visible and q is not, then q is a better than p;
if Np<Nq−1 or if (Np<=Nq+1 and p segment is shorter than q segment), then p is better than q;
Else q is better than p,
where p is a first selected output of the plurality of outputs, q is a second selected output of the plurality of outputs, Np is the number of intersecting disks included in the first selected output, Nq is the number of intersecting disks included in the second selected output, p segment is the distance from the given point to a first scanner associated with the first selected output, and q segment is the distance from the given point to a second scanner associated with the second selected output.

19. A non-transitory electronic-device readable medium having instructions stored thereon, the instructions when executed by one or more electronic devices operable to:
receive a point cloud that includes a plurality of points each having a position relative to at least one scanner, wherein the point cloud is captured by a plurality of scanners;
create a disk for each point of the point cloud, where the disk includes a size based on a computed scale for the point and an orientation based on a computed non-oriented normal for the point;
insert each disk into a search structure;
create a plurality of segments for a given point of the point cloud, wherein each of the plurality of segments represents a different path from the given point to each of the plurality of scanners;
query the search structure utilizing the plurality of segments to determine if one or more disks intersect each path from the given point to each of the plurality of scanners;
create a plurality of outputs based on the query, wherein each output corresponds to a different scanner of the plurality of scanners, and where each output includes a number of intersecting disks intersecting the path from the given point to the different scanner and further includes a distance from the given point to the different scanner;
implement a sorting algorithm that compares values of the plurality of outputs to identify a selected scanner of the plurality of scanners, where the selected scanner corresponds to a particular output of the plurality of outputs; and
assign the given point to a scanner position of the selected scanner.

20. The non-transitory electronic-device readable medium of claim 19, wherein the computed scale for the point is computed by dividing the distance from the point to a neighboring point by 2.

* * * * *